US009036045B2

(12) United States Patent
Fukui (10) Patent No.: US 9,036,045 B2
(45) Date of Patent: May 19, 2015

(54) IMAGE PROCESSING APPARATUS AND IMAGE PROCESSING METHOD

(75) Inventor: Takaaki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/452,568

(22) Filed: Apr. 20, 2012

(65) Prior Publication Data

US 2012/0281108 A1   Nov. 8, 2012

(30) Foreign Application Priority Data

May 2, 2011   (JP) ................................. 2011-103212

(51) Int. Cl.
| | |
|---|---|
| *H04N 9/73* | (2006.01) |
| *H04N 9/68* | (2006.01) |
| *H04N 5/228* | (2006.01) |
| *H04N 5/14* | (2006.01) |
| *H04N 5/232* | (2006.01) |

(52) U.S. Cl.
CPC ............... *H04N 9/735* (2013.01); *H04N 5/144* (2013.01); *H04N 5/23254* (2013.01)

(58) Field of Classification Search
CPC . H04N 5/23293; H04N 1/2112; H04N 9/735; H04N 5/23212; H04N 5/144; H04N 5/23254; H04N 5/2352; H04N 5/2256; H04N 5/23277; H04N 5/2351
USPC ........................ 348/208.4, 208.13, 223.1, 234
See application file for complete search history.

(56) References Cited

U.S. PATENT DOCUMENTS

| | | | | |
|---|---|---|---|---|
| 7,633,532 B2* | 12/2009 | Kobayashi | ................. | 348/223.1 |
| 7,932,931 B2* | 4/2011 | Ikeda et al. | ................. | 348/223.1 |
| 2007/0165960 A1* | 7/2007 | Yamada | ......................... | 382/254 |
| 2009/0225226 A1* | 9/2009 | Kakuta | ......................... | 348/655 |
| 2010/0020200 A1 | 1/2010 | Fujiwara | | |

FOREIGN PATENT DOCUMENTS

| | | |
|---|---|---|
| CN | 1846447 A | 10/2006 |
| CN | 101889435 A | 11/2010 |
| CN | 101998043 A | 3/2011 |
| JP | 3540485 B2 | 7/2004 |
| JP | 4389671 B2 | 12/2009 |

* cited by examiner

*Primary Examiner* — James Hannett
*Assistant Examiner* — Padma Haliyur
(74) *Attorney, Agent, or Firm* — Canon USA, Inc., IP Division (57) ABSTRACT

An image processing apparatus divides image data captured while a flash light is not emitted into a plurality of areas, calculates color evaluation value for each of the divided areas. The apparatus divides image data captured while the flash light is emitted into a plurality of areas and to calculate color evaluation value for each of the divided areas. The apparatus determines a movement for each of the plurality of areas in accordance with the calculated color evaluation value and the calculated color evaluation value. The apparatus performs white balance processing into image data in accordance with the determined movement.

8 Claims, 11 Drawing Sheets

| COLOR TEMPERATURE | Cx | Cy |
|---|---|---|
| 2000K | 1500 | 400 |
| 3000K | 1100 | 300 |
| 4000K | 600 | 240 |
| 5000K | 100 | 200 |
| 6000K | -500 | 220 |
| 7000K | -900 | 300 |
| 8000K | -1200 | 400 |

FIG. 9A
THRESHOLD DETERMINATION

| 4 | 1 | 6 | 6 | 7 | 25 | 15 | 50 | 5 |
|---|---|---|---|---|----|----|----|---|
| 5 | 6 | 0 | 30 | 30 | 15 | 10 | 4 | 4 |
| 25 | 15 | 40 | 5 | 300 | 200 | 100 | 3 | 30 |
| 30 | 30 | 30 | 150 | 500 | 400 | 150 | 120 | 30 |
| 6 | 7 | 25 | 150 | 200 | 150 | 500 | 150 | 30 |
| 6 | 7 | 25 | 30 | 150 | 120 | 130 | 30 | 30 |
| 50 | 5 | 4 | 1 | 6 | 5 | 7 | 25 | 80 |
| 4 | 1 | 6 | 6 | 7 | 25 | 15 | 50 | 50 |

FIG. 9B
ADJACENT CONNECTION

MAIN SCAN DIRECTION →

SUB SCAN DIRECTION ↓

| 0 | 0 | 0 | 0 | 0 | 0 | 0 | 1 | 0 |
|---|---|---|---|---|---|---|---|---|
| 0 | 0 | 0 | 0 | 0 | 0 | 0 | 0 | 0 |
| 0 | 0 | 0 | 0 | ● | 1 | 1 | 0 | 0 |
| 0 | 0 | 0 | 1 | 1 | 1 | 1 | 1 | 0 |
| 0 | 0 | 0 | 1 | 1 | 1 | 1 | 1 | 0 |
| 0 | 0 | 0 | 1 | 1 | 1 | 1 | 0 | 0 |
| 1 | 0 | 0 | 0 | 0 | 0 | 0 | 0 | ● |
| 0 | 0 | 0 | 0 | 0 | 0 | 0 | 1 | 1 |

IMAGE PROCESSING APPARATUS AND IMAGE PROCESSING METHOD

BACKGROUND OF THE INVENTION

1. Field of the Invention

The present invention relates a white balance correction of an image captured by an imaging apparatus.

2. Description of the Related Art

Imaging apparatuses using an image sensor such as a digital camera and a digital video camera are provided with the white balance control function for adjusting a color tone of an image captured by an imaging operation. This white balance control includes manual white balance control and automatic white balance control. The manual white balance control calculates a white balance coefficient by capturing a white object in advance and applies the calculated white balance coefficient to the entire screen. The automatic white balance control automatically detects a possible white portion from a captured image, calculates a white balance coefficient from an average value of each color component in the entire screen, and applies the calculated white balance coefficient to the entire screen.

Even when there is a light source different from a flash light in a scene that an imaging apparatus captures an image while emitting the flash light, the conventional automatic white balance control applies the white balance coefficient calculated as mentioned above to the entire screen. Therefore, it is difficult to perform the white balance control so as to achieve appropriate color tints for both the light sources. For example, in a scene that an imaging apparatus emits flash light which is a light source having a high color temperature, if the ambient light contains a low color temperature light source such as an electric light bulb color source, controlling the white balance based on the flash light results in unsuitable white balance for the low color temperature light source in the ambient light. On the other hand, controlling the white balance based on the low color temperature light source in the ambient light results in unsuitable white balance for the flash light. Further, even if the imaging apparatus performs the white balance control by adjusting the white balance to the middle between the respective light sources, this results in unsuitable white balance for both of the light sources, leading to generation of an image in which a region irradiated with the flash light in tinged with blue while a region irradiated with the low color temperature light source is tinged with red.

To solve this problem, the technique discussed in Japanese Patent No. 3540485 discloses as follows. This technique calculates a data ratio by comparing an image data captured while the flash light is emitted to an image data captured while the flash light is not emitted for each arbitrary object region, and determines a degree of contribution of the flash light based on the calculated ratio value, and determines a degree of contribution of the flash light based on the calculated ratio value. This technique performs the white balance control by selecting a white balance control value for each region for video data captured in an exposure with the flash light, according to the degree of contribution.

The technique discussed in Japanese Patent No. 4389671 discloses as follows. This technique extracts flash light components from an image captured while the flash light is emitted and an image captured while the flash light is not emitted. This technique detects areas in which an object blurs when an white balance control is switched in accordance with each of the flash light components, calculates a white balance coefficient for areas in which object does not blur and a white balance coefficient for the areas in which the object blurs using interpolating, and applies the calculated coefficients to the image data. To detect the areas in which the object blurs, high frequency components of the image data are detected.

The conventional technique discussed in Japanese Patent No. 3540485 has to estimate the irradiation amount of the flash light by calculating a difference between the image data captured while the flash light is emitted and the image data captured while the flash light is not emitted, and to perform the white balance control in accordance with the estimated irradiation amount. However, when the object is moving, it is impossible to estimate the irradiation amount and to perform the white balance control correctly. As a result, spots pattern is generated on the image data and high quality image is not be able to obtained.

The conventional technique discussed in Japanese Patent No. 4389671 adopts a method which detects the areas in which the object blurs by detecting the high frequency components. However, it is impossible to discriminate between the high frequency components which the image data has originally and the high frequency components caused by the object blurring and hands blurring. As a result, optimum white balance control is not be able to performed and high quality image is not be able to obtained.

SUMMARY OF THE INVENTION

The present invention features performing optimum white balance control for each of a plurality of image areas.

According to an aspect of the present invention, an image processing apparatus includes a first evaluation value calculation unit configured to divide image data (captured while a flash light is not emitted) into a plurality of areas and to calculate a first color evaluation value for each of the areas, a second evaluation value calculation unit configured to divide image data (captured while the flash light is emitted) into a plurality of areas and to calculate a second color evaluation value for each of the areas, a movement determination unit configured to determine a movement for each of the areas based on the first color evaluation value and the second color evaluation value, and a processing unit configured to perform white balance processing on image data based on the movement determined by said movement determination unit.

In accordance with another aspect of the present invention, an image processing method includes a first evaluation value calculation step of dividing image data (captured while a flash light is not emitted) into a plurality of areas and calculating a first color evaluation value for each of the areas, a second evaluation value calculation step of dividing image data (captured while the flash light is emitted) into a plurality of areas and calculating a second color evaluation value for each of the areas, a movement determination step of determining a movement for each of the areas based on the first color evaluation value and the second color evaluation value, and a processing step of performing white balance processing on image data in accordance with the movement determined in the movement determination step. Further aspects of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Hereinafter, an exemplary embodiment of a useful image processing apparatus of the present invention will be described in detail with reference to the accompanying drawings.

Figure 1:
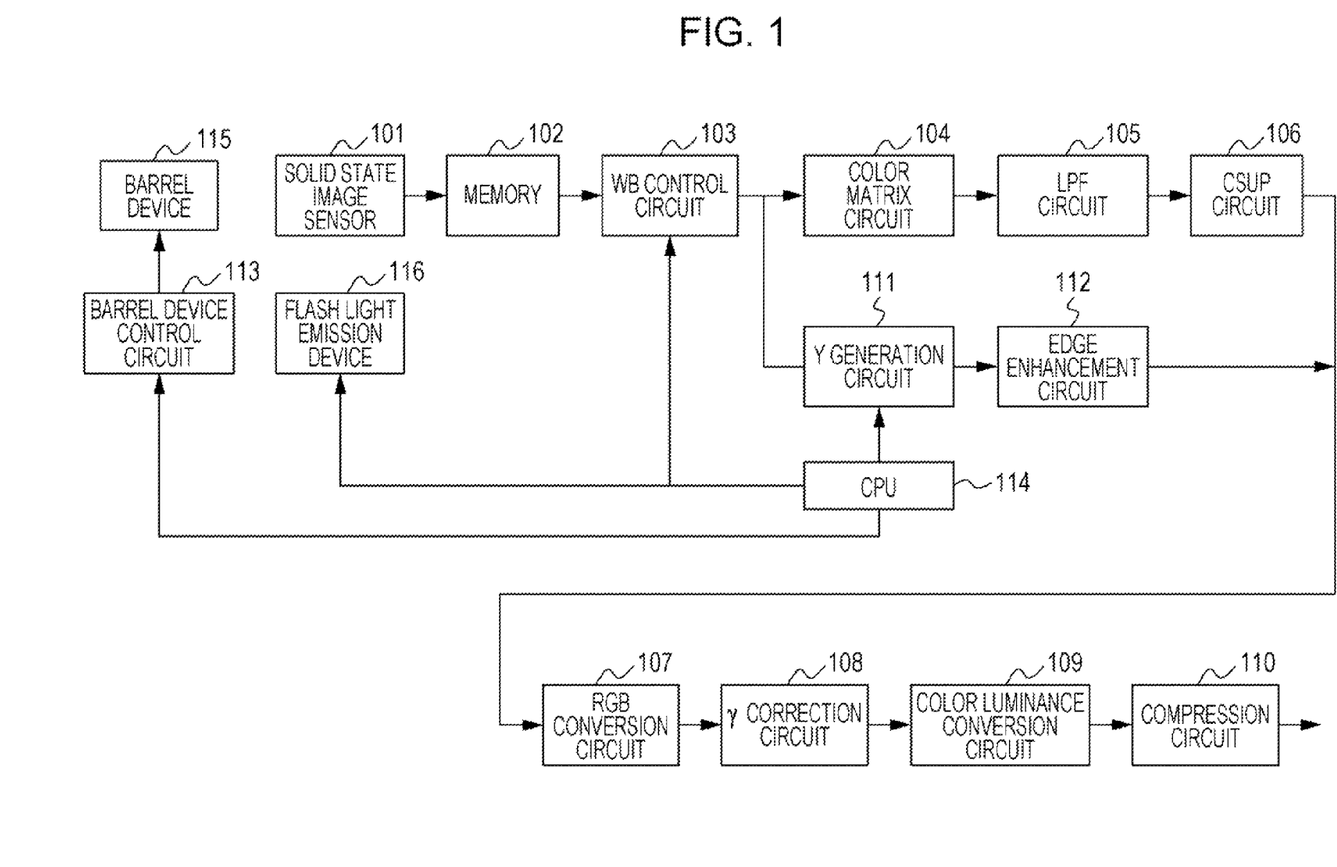
FIG. 1 is a block diagram illustrating an example of a circuit configuration of an image sensing apparatus according to an exemplary embodiment of the present invention.

FIG. 1 is a block diagram illustrating an example of a circuit configuration of an image sensing apparatus (a digital camera) according to the present exemplary embodiment. Referring to FIG. 1, a solid image sensor 101 is an image sensor constituted by, for example, a charge coupled device (CCD) or a complementary metal oxide semiconductor (CMOS). The surface of the solid image sensor 101 is covered with, for example, an RGB color filter such as the Bayer array so as to be configured to be capable of color photography.

A central processing unit (CPU) 114 calculates such a shutter speed and a diaphragm value that an entire image is lighted up, and calculates a drive amount of a focus lens so as to focus on an object located within a focusing region. Then, the information calculated by the control unit 14, i.e., the exposure value (the shutter speed and the diaphragm value) and the drive amount of the focus lens are transmitted to a barrel device control circuit 113, and a barrel device 115 is controlled according to the respective values. Similarly, when emission amount of the flash light is controlled, CPU 114 calculates the emission amount of the flash light and causes a flash light emission device 116 to emit the light by a predetermined light amount.

A white balance (WB) control circuit 103 calculates a white balance (WB) coefficient based on the image signal stored in the memory 102, and applies a WB correction to the image signal stored in the memory 102 with use of the calculated WB coefficient. The details of the configuration of the WB control circuit 103 and the method of calculating the WB coefficient will be described later.

A color matrix circuit 104 converts the image signal, to which the WB control circuit 103 has applied the WB correction, into a color-difference signal R-Y/B-Y by multiplying the image signal by a color gain so that the image signal can be reproduced by an optimal color. A low path filter (LPF) circuit 105 is a circuit to limit the band of the color-difference signal R-Y/B-Y. A chroma suppress (CSUP) circuit 106 is a circuit to remove a false color signal of a saturated portion of the image signals of the band limited by the LPF circuit 105. On the other hand, the image signal to which the WB control circuit 103 has applied the WB correction is also output to a luminance signal generation circuit 111. The luminance signal generation circuit 11 generates a luminance signal Y from the input image signal. An edge enhancement circuit 112 applies the edge enhancement process to the generated luminance signal Y.

An RGB conversion circuit 107 converts the color difference signal R-Y, B-Y from the CSUP circuit 106 and the luminance signal Y output from the edge enhancement circuit 112 into an RGB signal. A gamma correction circuit 108 applies a gradation correction to the converted RGB signal. After that a color luminance conversion circuit 109 converts the RGB signal with the corrected gradation into a YUV signal. Further, a compression circuit 110 compresses the converted YUV signal by, for example, the JPEG (Joint Photographic Experts Group) method, and stores the compressed data in an external or internal recording medium 115 as an image signal.

Next, the method in which the WB control circuit 103 calculates the WB coefficient will be described in detail. As a first, by referring a flowchart illustrated in FIG. 2, a first WB coefficient as a WB coefficient for an image captured while a flash light is emitted (this state is hereinafter referred to as "a flashed image"). The first WB coefficient is calculated from the flashed image.

Figure 2:
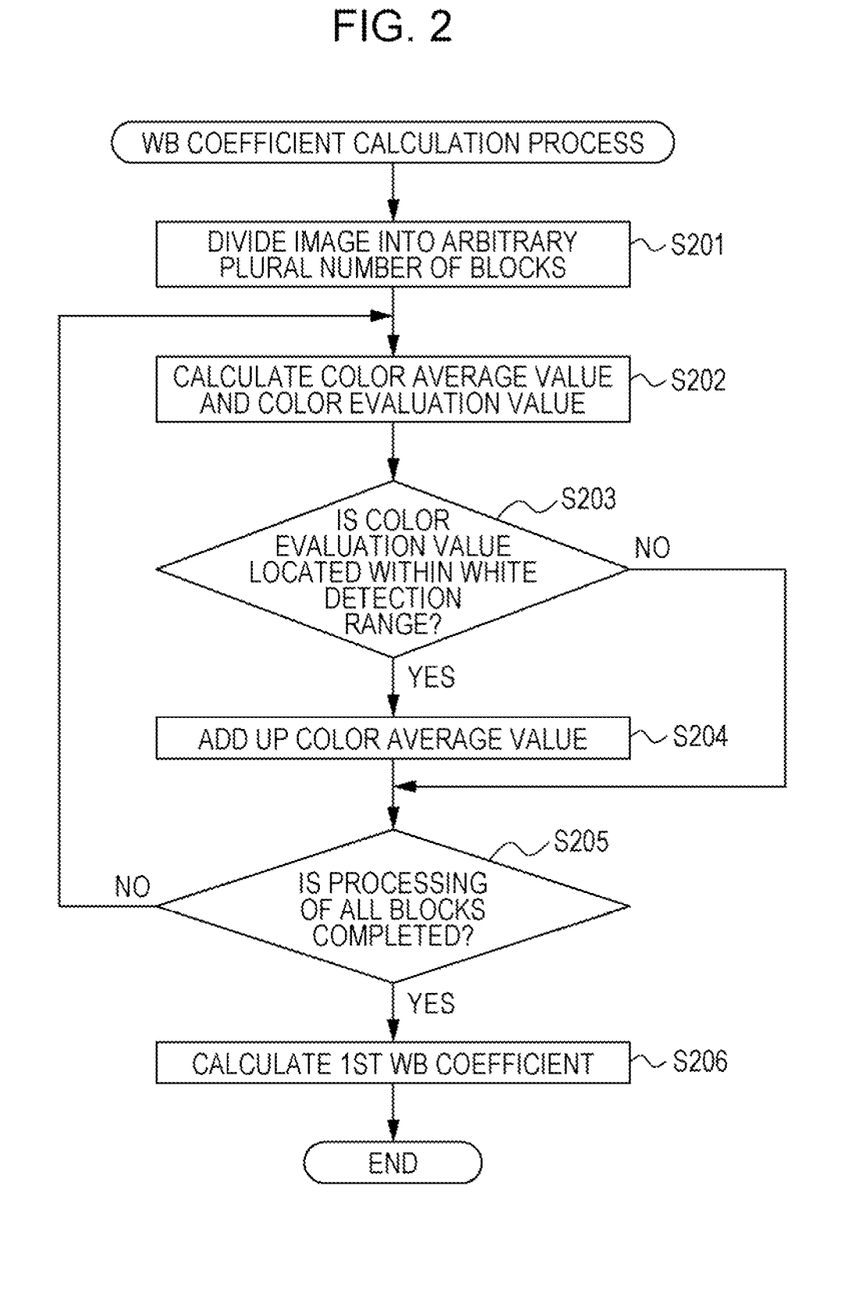
FIG. 2 is a flowchart illustrating WB coefficient calculation process.

First, in step S201, the WB control circuit 103 reads out a flashed image stored in the memory 102, and divides the image data into an arbitrary number m of blocks. Then, in step S202, for each of the m blocks, the WB control circuit 103 averages the pixel values for each color to calculate a color average value (R[i], G[i], B[i]). Then, the WB control circuit 103 further calculates a color evaluation value (Cx[i], Cy[i]) with use of the following equation (1)

$$Cx[i]=(R[i]-B[i])/Y[i]\times 1024$$

$$Cy[i]=(R[i]+B[i]-2G[i])/Y[i]\times 1024 \quad \text{[EQUATION 1]}$$

(In this equation, Y[i]=(R[i]+2G[i]+B[i])/4).

Figure 3A:
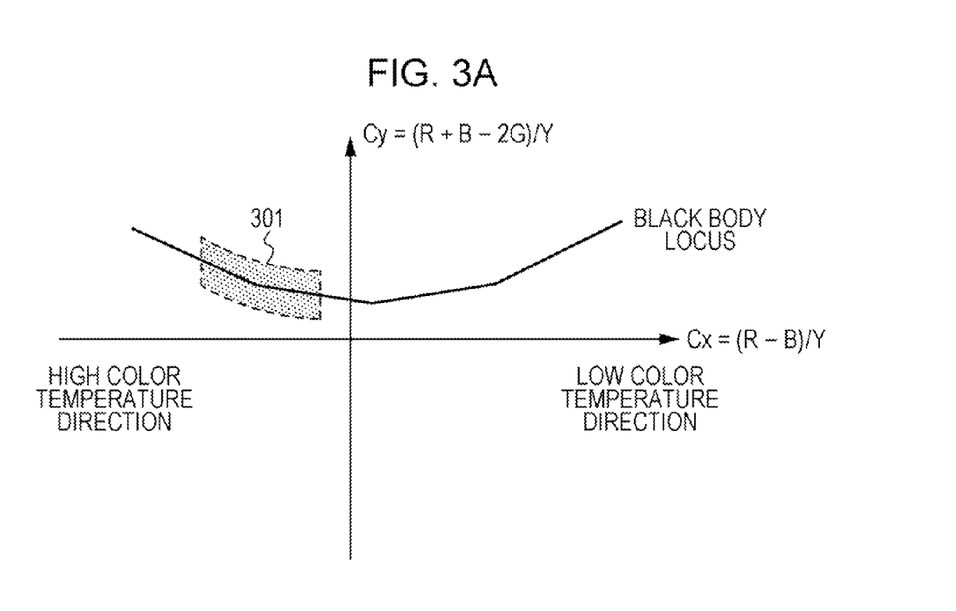
FIGS. 3A and 3B are charts used for white detection.
Figure 3B:
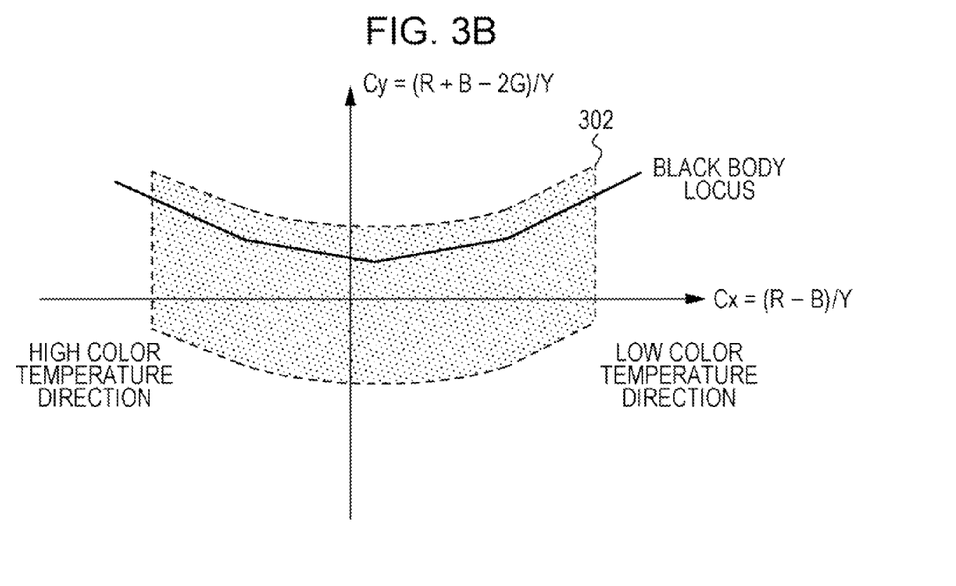

The WB control circuit 103 performs white detection with use of a chart having axis indicated in FIG. 3A and FIG. 3B. In FIG. 3A, the negative direction of the x axis (Cx) represents the color evaluation value when a white object is captured in a high color temperature. While the positive direction of the x axis represents the color evaluation value when white object is captured in a low color temperature. Further, the y axis (Cy) represents a degree of the green component of a light source. As the value is increased in the negative direction of the y axis, the green component is increased, which indicates that the light source is a fluorescent bulb.

Figure 4A:
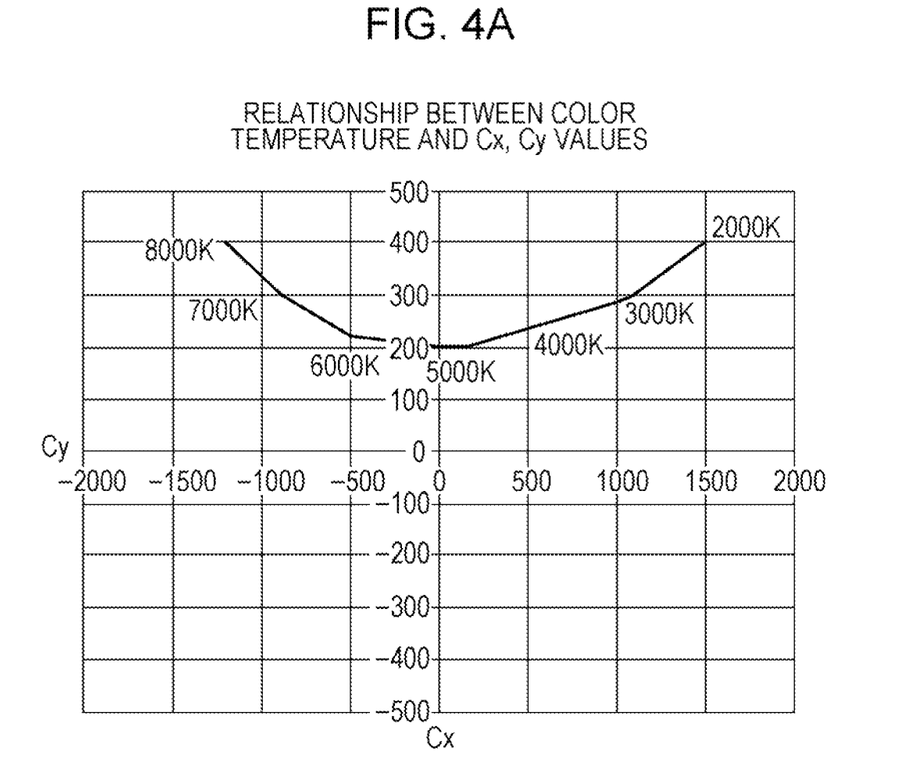
FIGS. 4A and 4B are a chart and a graph indicating relationship between color temperatures and Cx-Cy values.
Figure 4B:
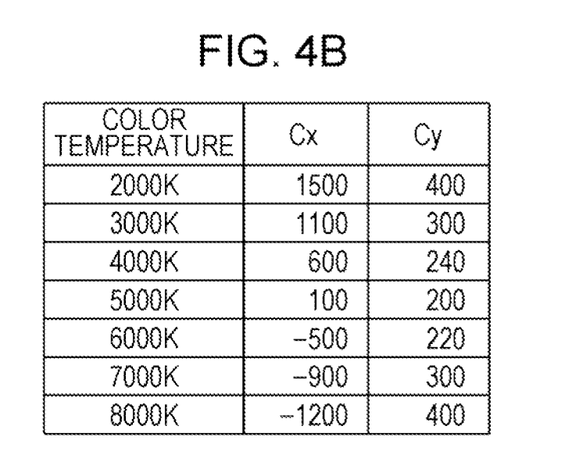

FIG. 4A is a chart indicating relationship between color temperature and Cx-Cy value. FIG. 4B is a graph listing Cx value and Cy value for each color temperatures. The relationship between color temperature and Cx-Cy value becomes clear by acquiring image data with use of light sources of which color temperatures have been known and corresponds to points of the black body locus and calculating Cx values and Cy values. Not only the relationship of the color temperature, relationship between light sources which have characteristics in the direction to the green and magenta such as white fluorescent light and Cx-Cy value also becomes clear. Moreover, Cx value and Cy value of the flash light is calculated by acquiring relationship between emission color temperature and Cx value and Cy value and specifying the emission color temperature from the relationship.

In step S203, the WB control circuit 103 determines whether the color evaluation value (Cx[i],Cy[i]) of the i-th block calculated in step S202 is located within a preset white detection range 301 illustrated in FIG. 3A. The white detection range 301 illustrated in FIG. 3A is a limited detection range since this is to detect white under the light source of the flash light. If the calculated color evaluation value (Cx[i], Cy[i]) is located within this white detection range 301, the process moves to step S204. On the other hand, if the value (Cx[i], Cy[i]) is not located within this white detection range 301, the process skips step S204 and moves to step S205.

In step S204, the WB control circuit 103 determines that the i-th block is white and adds up the color average values (R[i], G[i], B[i]) with use of the following equation (2)

$$SumR = \sum_{i=0}^{m} Sw[i] \times R[i]$$
$$SumG = \sum_{i=0}^{m} Sw[i] \times G[i]$$
$$SumB = \sum_{i=0}^{m} Sw[i] \times B[i]$$

[EQUATION 2]

In this equation (2), Sw[i] is set to 1 if the color evaluation value (Cx[i], Cy[i]) is located within the white detection range 301, while Sw[i] is set to 0 if the color evaluation value (Cx[i], Cy[i]) is not located within the white detection range 301. Setting Sw[i] in this way enables the WB control circuit 103 to perform or skip the addition of the color average value (R[i], G[i], B[i]).

Subsequently, in step S205, the WB control circuit 103 determines whether the WB control unit 103 has decided whether the color evaluation value is located within the color detection range 301 for all of the blocks. As a result of the determination in step S205, if there is any block left to be processed (No in step S205), the processing returns to step S202. If all of the blocks are processed (YES in step S205), the processing proceeds to the next step, step S206.

Subsequently, in step S206, the WB control circuit 103 calculates a first WB coefficient (WBCol_R1, WBCol_G1, WBCol_B1) from the determined summation value (SumR1, SumG1, SumB1) of the color average values with use of the following equation (3)

$WBco\_R1 = sumY1 \times 1024/sumR1$ $WBco\_G1 = sumY1 \times 1024/sumG1$ $WBco\_B1 = sumY1 \times 1024/sumB1$ [EQUATION 3]

(In this equation, sumY1=(sumR1+sumG1+sumB1)/4). Alternatively, a first WB coefficient for the flash light may be set in advance as a known value.

Figure 5:
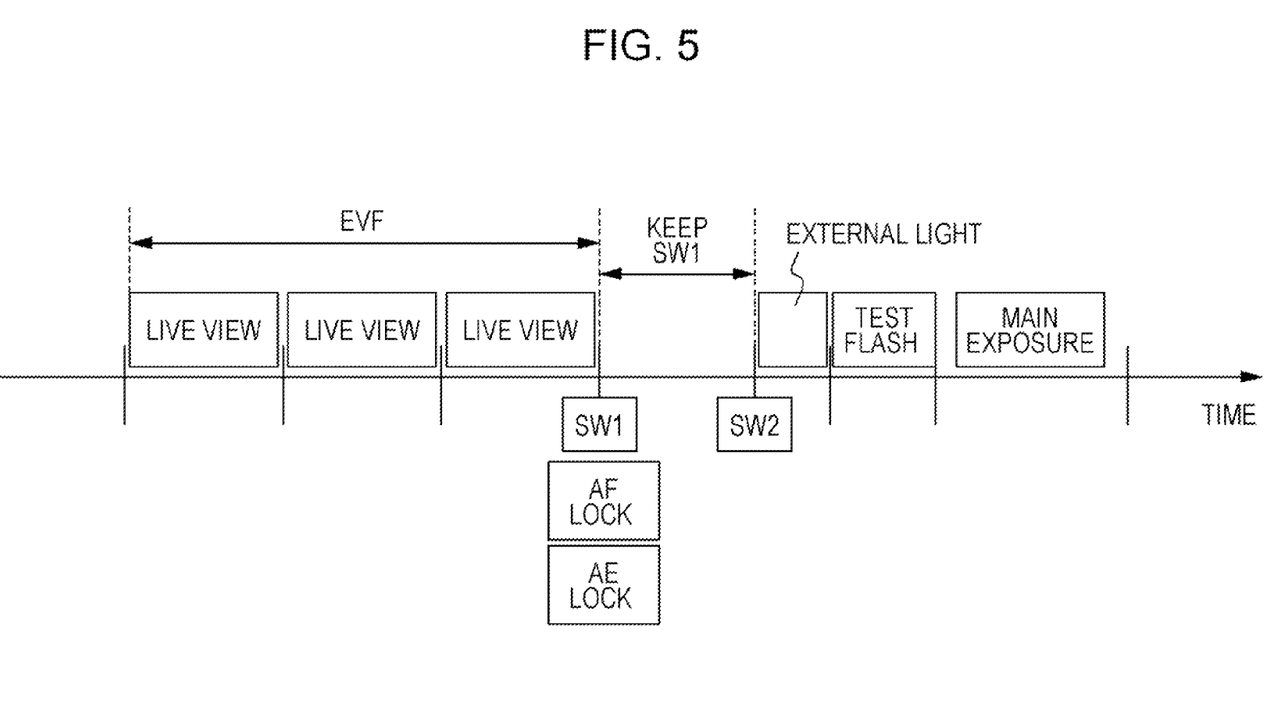
FIG. 5 is a time chart illustrating control sequences of image capturing.

Next, the method for calculating a second WB coefficient will be described. The second WB coefficient is calculated from image data captured while the flash light is not emitted (this state is hereinafter referred to as "a non-flashed image"). FIG. 5 illustrates image capturing control arranged in chronological order. Referring to FIG. 5, the digital camera 100 periodically captures a live view image before the shutter button is half-pressed (this state is hereinafter referred to as "SW1"). When the digital camera 100 is set into the SW1 state, the digital camera 100 starts the automatic focus (AF) lock and the automatic exposure (AE) lock. Further, when the shutter button is fully pressed (this state is hereinafter referred to as "SW2"), the digital camera 100 emits the flash light as a test flash and then proceeds to a main exposure. In the present exemplary embodiment, the non-flashed image corresponds to the image data exposed to light during the period indicated by "EXTERNAL LIGHT" in FIG. 5, which is captured before the test flash. Alternatively, the non-flashed image emitted may be image data exposed to light and captured after the main exposure or live view image data.

Figure 6:
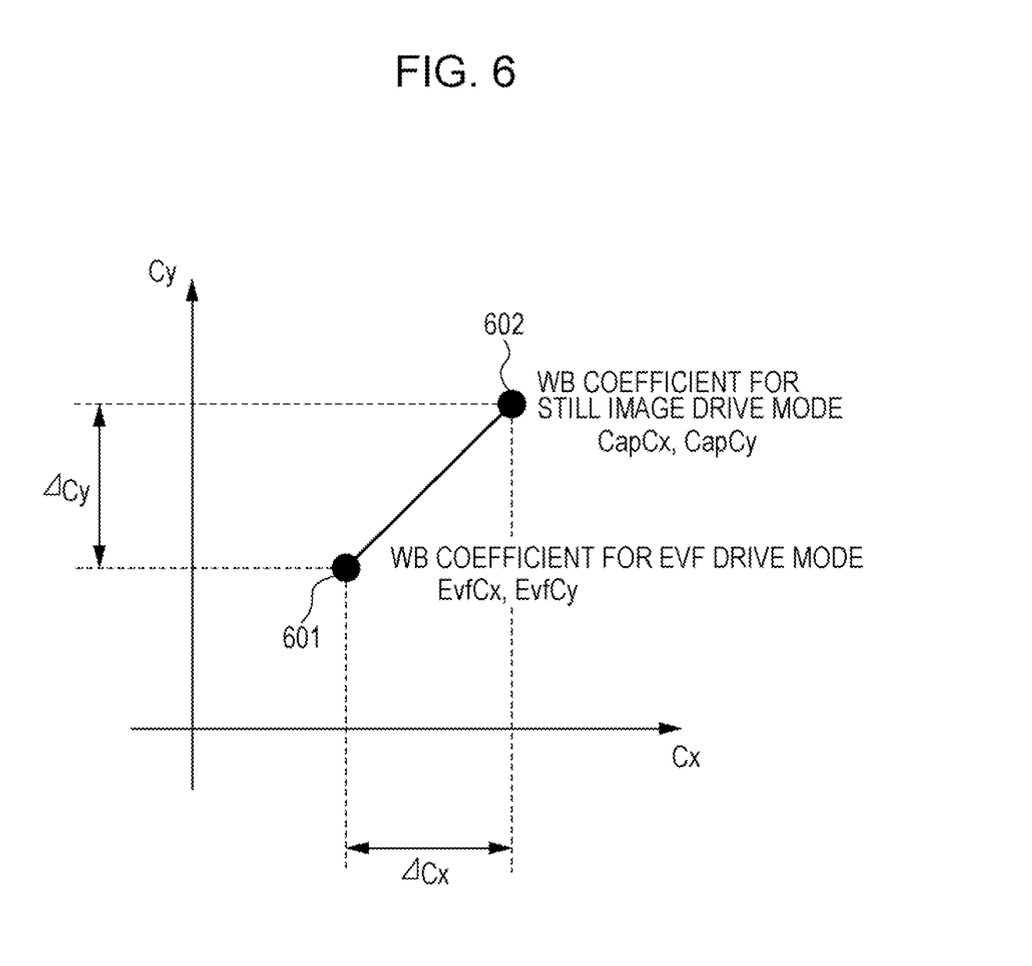
FIG. 6 is a diagram illustrating a WB coefficient for a still image capturing drive mode and a WB coefficient in EVF capturing drive mode.

The method for calculating the second WB coefficient is performed by the WB control circuit 103 similar to the above-described method for calculating the first WB coefficient value. A difference from the calculation of the first WB coefficient is use of a white detection range for the external light, as indicated by a white detection range 302 illustrated in FIG. 3B. This is because the flash light is a known light source, while the external light is an unknown light source, whereby it is impossible to set a limitation to the white detection range corresponding to the white detection range 301 corresponding to emission of the flash light. The white detection range 302 illustrated in FIG. 3B is defined by shooting white under difference light sources in advance and plotting calculated color evaluation values along a black body locus. This white detection range 302 can be set so as to have a different range depending on a shooting mode. The second WB coefficient can be applied to even a different imaging drive mode. For example, the WB coefficient for Electronic View Finder (EVF) calculated in the past may be used as the second WB coefficient. However, in a case where a spectral difference is generated depending on the drive mode. The WB coefficient for still image capturing driving mode and the EVF image capturing driving mode are illustrated in FIG. 6. When the WB control circuit 103 calculates the WB coefficient for still image capturing driving mode with use of the WB coefficient EvfCx and EvfCy 601 which is obtained before in EVF image capturing driving mode, the WB control circuit 103 corrects the EvfCx and EvfCy by ΔCx and ΔCy as illustrated in FIG. 6. Then the second WB coefficient for still image capturing driving mode CapCx and CapCy 602 is calculated.

Figure 7:
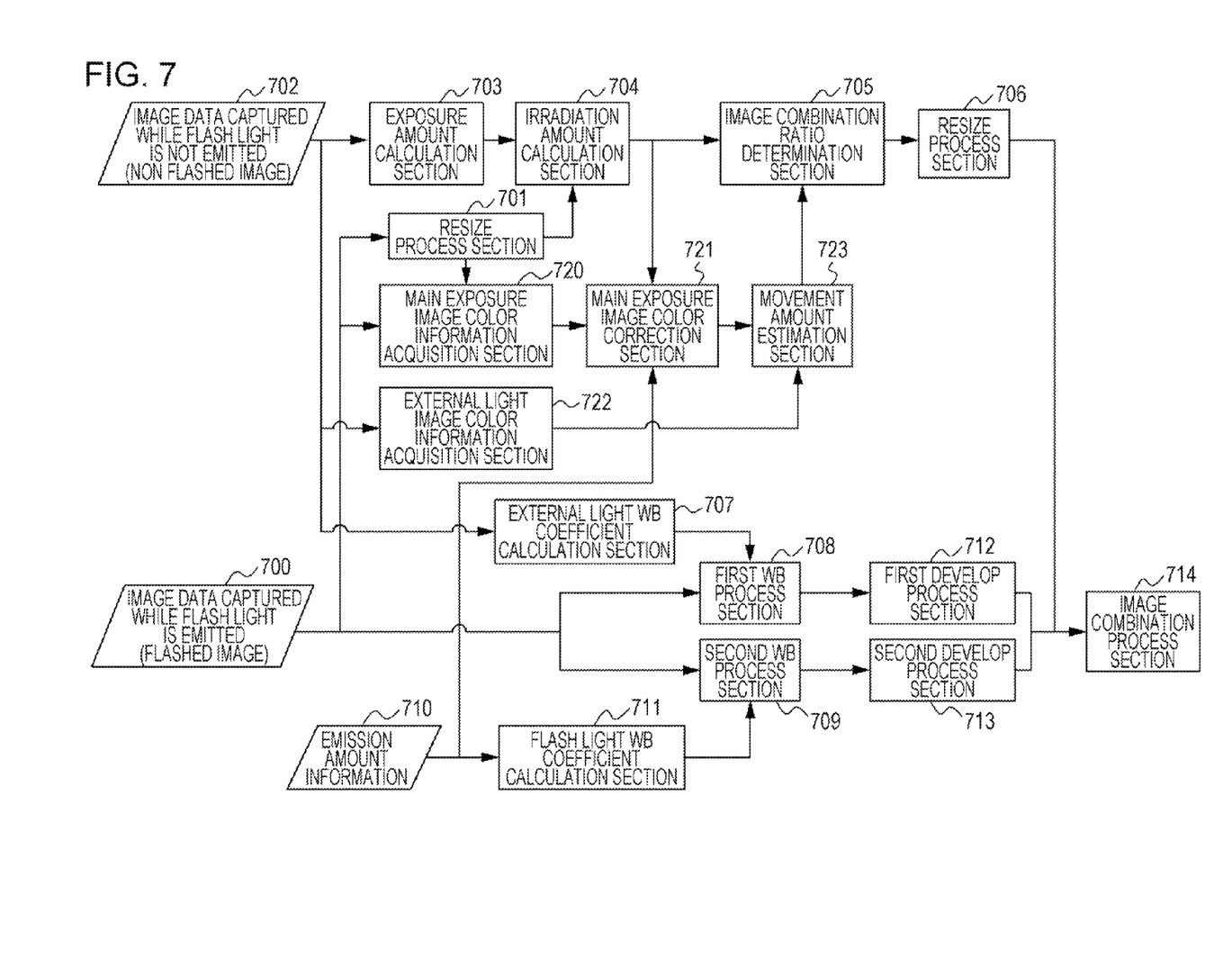
FIG. 7 is a block diagram illustrating functional structure of the image sensing apparatus in the exemplary embodiments.

FIG. 7 is a block diagram illustrating a functional structure of the image sensing apparatus according to the present exemplary embodiment. The image sensing apparatus stores the non-flashed image 702 and the flashed image 700 in response to a designation of capturing. An external light WB coefficient calculation section 707 calculates a WB coefficient for an external light from the non-flashed image. An first WB processing section 708 performs WB (white balance) process by multiplying the WB coefficient for the external light by the flashed image 700. A first develop process section 712. A develops the flashed image 700 for which the white balance is processed and generates YUV image data for an external light. The calculation method of the WB coefficient for the external light is similar to the calculation method of the second WB coefficient which is described above.

A flash light WB coefficient calculation section 711 calculates WB coefficient for the flash light in accordance with flash amount information 710 indicating amount of the emitted flash. A second WB process section 709 performs WB process by multiplying the WB coefficient by the flashed image 700. A second develop process section 713 develops the flashed image 700 processed by the second WB process section 709 to generate YUV image data for the flash light. In the develop process, YUV image data for the flash light may be generated by perform the WB processing for the flashed image 700 with use of the first WB coefficient.

A resize process section 701 converts a size of the flashed image 700 into a size of the non-flashed image 702, divides the resized image data into a plurality of blocks, and calculates the integration value of the average values of the divided blocks. Similarly, the resize process section 701 divides the non-flashed image 702 into a plurality of blocks, and calculates the integration value of the average values of the divided blocks. When these process are performed, a field angle of the each blocks in the flashed image 700 is set to be same as a field angle of the each blocks in the non-flashed image 702. An exposure amount calculation section 703 calculates a difference between amount of main exposure and amount of exposure set for the external light in accordance with relationship of parameters of the main exposure and parameters of the exposure of the external light. The parameters include sensitivity, amount of aperture, and shutter speed. The exposure amount calculation section 703 changes the integration value for color average value of the non-flashed image 702 to be the integration value for color average value of the areas on which the flash light is not irradiated becomes same exposure amount so that the two exposure amount become same amount. An irradiation amount calculation section 704 calculates irradiation amount of the flash light for the each blocks. An external light image color information acquisition section 722 calculates color evaluation value from the non-flashed image 702. A main exposure image color acquisition section 720 acquires integration value of the average color values of the flashed image 700 from the resize process section 701. A main exposure image color correction section 721 performs a WB correction for the integration value of the flashed image 700 acquired by the main exposure image color information acquisition section 720 in accordance with the irradiation amount of the flash light of the each blocks, and acquires color evaluation values of the non-flashed image 700.

A movement amount estimation section 723 calculates, as movement amount of an object, a difference between the color evaluation value of the flashed image 700 calculated by the main exposure image color correction section 721 and the color evaluation value of the non-flashed image 702 calculated by the external light image color information acquisition section 722. An image combination ratio determination section 705 determines a ratio of combination for the each blocks in accordance with the irradiation amount of the flash light and the movement amount of the object. The resize process section 706 enlarges the ratio of the each blocks so that a size of the enlarged ratio become same as a size of the non-flashed image 702. An image combination process section 714 combines YUV image data output from the first develop process section and YUV image data output from the second develop process section.

Figure 8:
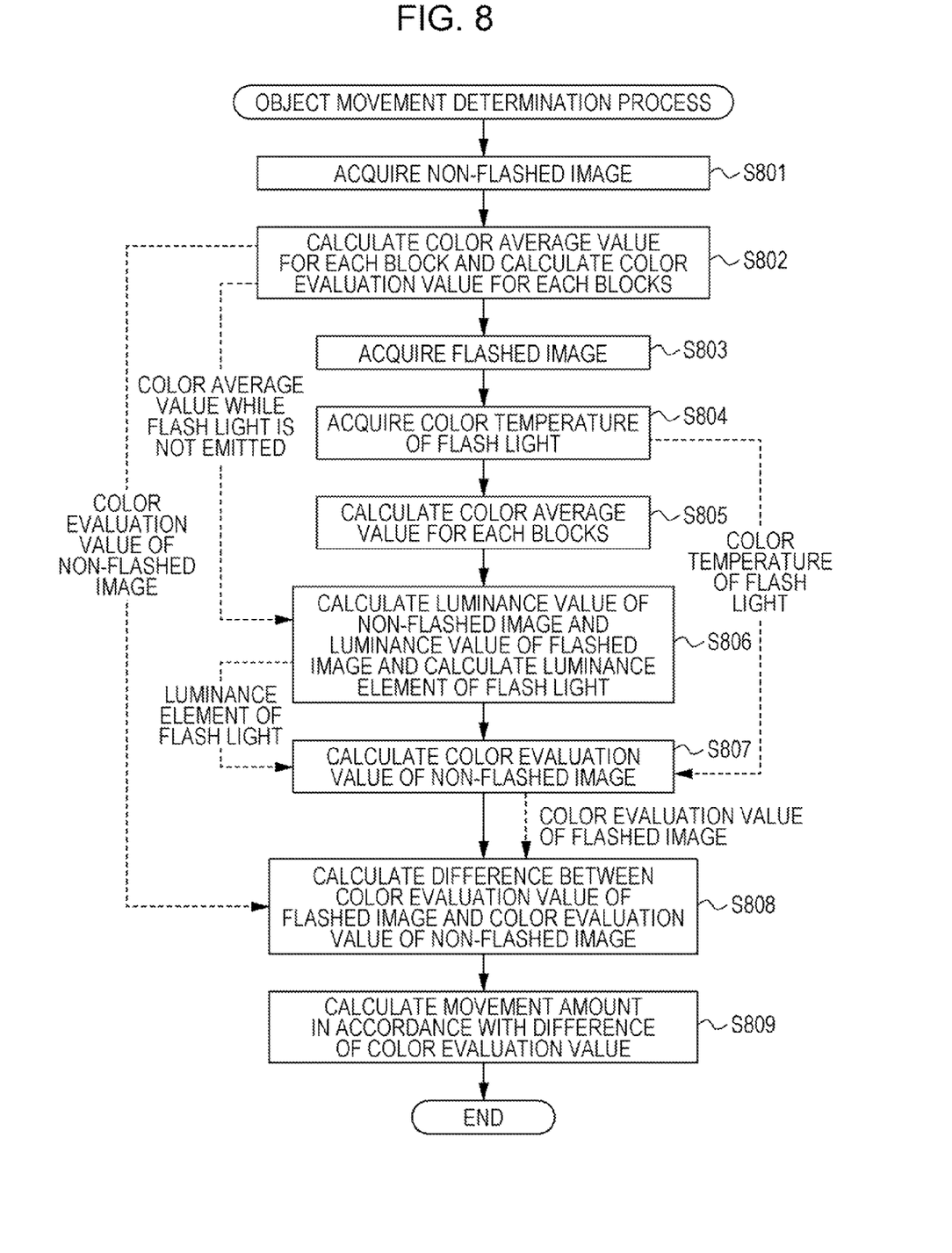
FIG. 8 is a flowchart illustrating determination process of the object movement between the flashed image and the non-flashed image.

FIG. 8 is a flowchart illustrating the determination process of the object movement between the image data while the flash light is emitted 700 (the flashed image) and the image data while the flash light is not emitted (the non-flashed image) 702.

As shown in FIG. 5, In step S801, when the SW2 is pushed as an instruction of capturing while SW1 is kept on, the external light image color information acquisition section 722 acquires newest non-flashed image 702. In step S802, the external light image color information acquisition section 722 calculates, by adding pixel data of each color and averaging them, a color average value (R2[i], G2[i], B2[i]) for each of the blocks (1 to n) of the non-flashed image 702. The external light image color information acquisition section 722 calculates color evaluation values of the non-flashed image 702 Cx_evf, WCy_evf with use of EQUATION (4)

$$R2'[i]=WB\_R\_evf[i] \times R2[i]$$

$$G2'[i]=WB\_G\_evf[i] \times G2[i]$$

$$B2'[i]=WB\_B\_evf[i] \times B2[i]$$

$$WCx\_evf[i]=(R2'[i]-B2'[i])/Y2'[i] \times 1024$$

$$WCy\_evf[i]=(R2'[i]+B2'[i]-2G2'[i])/Y2'[i] \times 1024 \quad \text{[EQUATION 4]}$$

(In this equation, $Y2'[i]=(R2'[i]+2G2'[i]+B2'[i])/4$)
In this equation, WB_R_evf is a WB coefficient of red (R) for the external light, WB_G_evf is a WB coefficient of green (G) for the external light, and WB_B_evf is a WB coefficient of blue (B) for the external light.

In step S803, the main exposure image color information acquisition section 720 acquires the flashed image 700. In step S804, the main exposure image color correction section 721 acquires a color temperature of the flash light (this state is hereinafter referred to as "a flash light color temperature") from the emission amount information 710. Since the flash light color temperature is determined by a relation between a color temperature as a emission characteristic of a xenon lamp and a emission period, the WB coefficient for the flash light is also calculated from the emission amount information 710 as described above.

In step S805, the main exposure image color information acquisition section 720 calculates color average values (R1[i], G1[i], B1[i]) by averaging pixel values for each color. This calculation is performed for each of blocks (1-$n$) in the flashed image 700 which is acquired in step S803.

In step S806, the external light image color information acquisition section 722 calculates, as indicated in equation (5), a luminance element of the external light a[i] in accordance with the color average value of the each block of the non-flashed image 702 calculated in step S802. The main exposure image color information acquisition section 720 calculates, as indicated in equation (5), a luminance element b[i] in accordance with the color average value of the each block of the flashed image 700 calculated in the step S805. Moreover, the main exposure image color information acquisition section 720 calculates, as indicated in equation (5), a luminance element of the flash light c[i] as a difference of the luminance elements.

$$a[i]=0.3*R2[i]+0.6*G2[i]+0.1*B2[i]$$

$$b[i]=0.3*R1[i]+0.6*G1[i]+0.1*B1[i]$$

$$c[i]=b[i]-a[i] \quad \text{[EQUATION 5]}$$

When settings about exposure amount and sensitivity for the flashed image 700 are different from that for the non-flashed image 702, the main exposure image color information acquisition section 720 corrects the exposure difference for the luminance elements of the external light b[i]. This correction enables the calculation of the luminance element of the flash light.

In step S807, the main exposure image color correction section 721 calculates a color evaluation value of the flashed image 700 in accordance with the luminance element c[i] calculated in the step S806 and the flash light color temperature obtained in step S804.

The main exposure image color correction section 721 calculates a mix ratio α in accordance with EQUATION (5) for each of the blocks.

$$\alpha[i]=c[i]/(a[i]+c[i])$$ [EQUATION 6]

The main exposure image color correction section 721 calculates the WB coefficient for main exposure in accordance with the WB coefficient for the external light, the WB coefficient for the flash light and the mix ratio α. More specifically, the WB coefficient for the main exposure is calculated by the following equation (7). In the equation, WB_X_cap [i] (X is R, G, or B) is the WB coefficient of the color X for the main exposure, WB_X_evf [i] (X is R, G, or B) is the WB coefficient of the color X for the external light, WB_X_flash [i] (X is R, G, or B) is the WB coefficient of the color X for the flash light.

$$WB\_R\_cap[i]=WB\_R\_evf[i]\times(1-\alpha[i])+WB\_R\_flash[i]\times\alpha[i]$$

$$WB\_G\_cap[i]=WB\_G\_evf[i]\times(1-\alpha[i])+WB\_G\_flash[i]\times\alpha[i]$$

$$WB\_B\_cap[i]=WB\_B\_evf[i]\times(1-\alpha[i])+WB\_B\_flash[i]\times\alpha[i]$$ [EQUATION 7]

The main exposure image color correction section 721 calculates color evaluation values WCx_cap[i] and WCy_cap[i]. More specifically, WCx_cap[i] and WCy_cap[i] is calculated by the following equation (8).

$$R1'[i]=WB\_R\_cap[i]\times R1[i]$$

$$G1'[i]=WB\_G\_cap[i]\times G1[i]$$

$$B1'[i]=WB\_B\_cap[i]\times B1[i]$$

$$WCx\_cap[i]=(R1'[i]-B1'[i])/Y1'[i]\times 1024$$

$$WCy\_cap[i]=(R1'[i]+B1'[i]-2G1'[i])/Y1'[i]\times 1024$$ [EQUATION 8]

here, $Y1'[i]=(R1'[i]+2G1'[i]+B1'[i])/4$

In step S808, the main exposure image color correction section 721 calculates a difference between the color evaluation value of the flashed image 700 and the color evaluation value of the non-flashed image 702. More specifically, the difference ΔWCx and ΔWCy are calculated by the following equation (9).

$$\Delta WCx=|WCx\_cap[i]-WCx\_evf[i]|$$

$$\Delta WCy=|WCy\_cap[i]-WCy\_evf[i]|$$ [EQUATION 9]

Next, the main exposure image color correction section 721 calculates a summation value of the color evaluation values with use of following equation (10).

$$\Delta WCxCy=\Delta WCx+\Delta WCy$$ [EQUATION 10]

The irradiation amount of the flash light is calculated from the difference between the luminance value of the flashed image 700 and the luminance value of the non-flashed image 702. When the object does not move, the irradiation amount is calculated appropriately. when the object or the light source does not move and the calculation of the irradiation amount of the flash light is correct, the WB coefficient and the color evaluation value are calculated appropriately. On the other hand, when the object moves or the amount of the light source changes rapidly, the estimation of the irradiation amount of the flash light is easy to be missed and the WB coefficient is not calculated appropriately. As a result, the color evaluation value is not calculated appropriately. Accordingly, Whether the movement of the object or the change of the light source exist or not can be determined in accordance with the difference of the color evaluation value.

In step S809, the movement amount estimation section 723 calculates the movement amount in accordance with summation of the difference of the color evaluation values which is calculated for the each blocks.

Figure 9A:
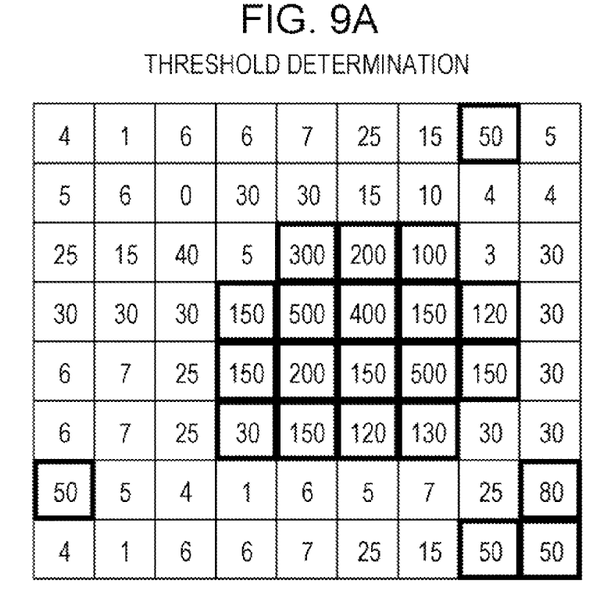
FIGS. 9A and 9B are diagrams illustrating calculation process of movement amount in accordance with summation value of difference of the color evaluation value for each blocks.
Figure 9B:
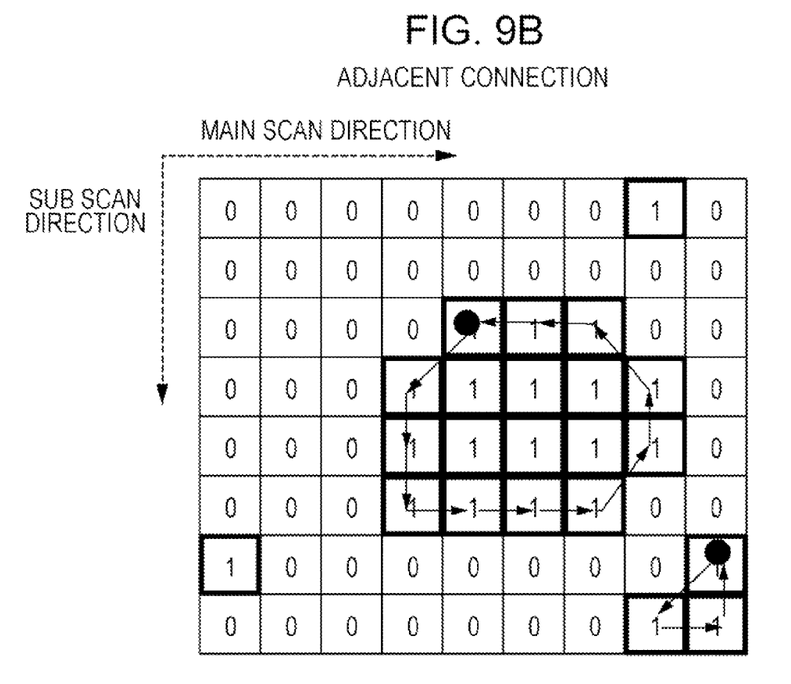

FIG. 9A and FIG. 9B are diagrams illustrating calculation process of the movement amount in accordance with the summation of the difference of the color evaluation values for the each blocks. Numbers in the blocks in FIG. 9A and FIG. 9B indicate the difference of the color values ΔWCxCy.

A movement amount estimation section 723 applies a predetermined threshold value to the summation value ΔWCxCy. FIG. 9A illustrates an example application in which the threshold value Th is 50 and the movement amount estimation section 723 determines that the block which has the summation value Δ WCxCy greater than the threshold value is a moving block. In this embodiment, the threshold value is a constant, but it may be a valuable changing in accordance with the color evaluation values of the non-flashed image 702 WCx, WCy. sensitivity for the each colors differs in accordance with the color of the object and the color temperature which is a capturing condition for the non-flashed image 702. Accordingly, accuracy of the determination process of the movement amount becomes higher by changing the sensitivity of each of colors.

The summation value of the differences of the color evaluation values calculated in the determination process of the movement amount of the object is multiplied with the WB coefficient in accordance with the color temperature of the light source. However, correction of the color elements is not performed. The value of the gray area can be calculated exactly, but a margin of error is caused when the value of the chromatic color area is calculated. For example, a red object captured in a low color temperature and a blue object captured in a high color temperature tend to emit colors strongly. To decrease the margin of error of each of the color temperature, color correction in accordance with a color temperature for the original external light and a WB coefficient for the external light and a correction for each of the objects should be performed. These correction make the calculation more exactly.

This correction is realized by calculating, for each of the color temperatures and the applied WB coefficients, correction gains of WCx and WCy for the non-flashed image 702 and the flashed image 700 in advance. For example, the WCx and WCy may be corrected in accordance with the WB coefficient and the color temperature with use of EQUATION (11).

$$\begin{pmatrix} WCx' \\ WCy' \end{pmatrix} = \begin{pmatrix} a, b \\ c, d \end{pmatrix} \begin{pmatrix} WCx \\ WCy \end{pmatrix}$$ [EQUATION 11]

In this equation, the correction value a, b, c, d are coefficients which make the WCx and WCy for each of the color temperatures same as a WCx and WCy for 5000K. These values are obtained by capturing a color chart for each of color temperature. Needless to say, a correction value for a color temperature which is not obtained can be calculated by performing linear interpolation of the correction values for the obtained color temperatures. This color conversion process has an effect same as that of the color reproduce matrix which absorbs difference between the plurality of the color temperatures. The movement determination process of the object becomes more correctly with use of the absorption of the difference by these processes.

FIG. 9B illustrates a process of combining 8 movement blocks which are adjacent each other. In this embodiment, firstly, the movement blocks are searched to the horizontal direction of screen (MAIN SCAN DIRECTION) and secondary, these are searched to the vertical direction (SUB SCAN DIRECTION). when a movement block is detected, right hand search is implemented to calculate size of the combination blocks. The example illustrated in FIG. 9B indicates a condition in which one combination of 4 (vertical)×5 (horizontal) blocks and two combinations of 2×2 blocks is detected. In accordance with the above detection result, the movement amount estimation section 723 extracts the maximum block size as the movement of the entire screen. Before implementing the combination process of the 8 adjacent blocks, a little movement which is caused by such as a flicker of the light source or a neon light switching on and off may be removed by performing a median filter for the blocks. As a substantial manner of the calculating the maximum block size, calculating a total number of the movement blocks, calculating a size of the total blocks, or calculating a integration of values which are obtained by multiplying the differences of the color evaluation value and block number.

Figure 10:
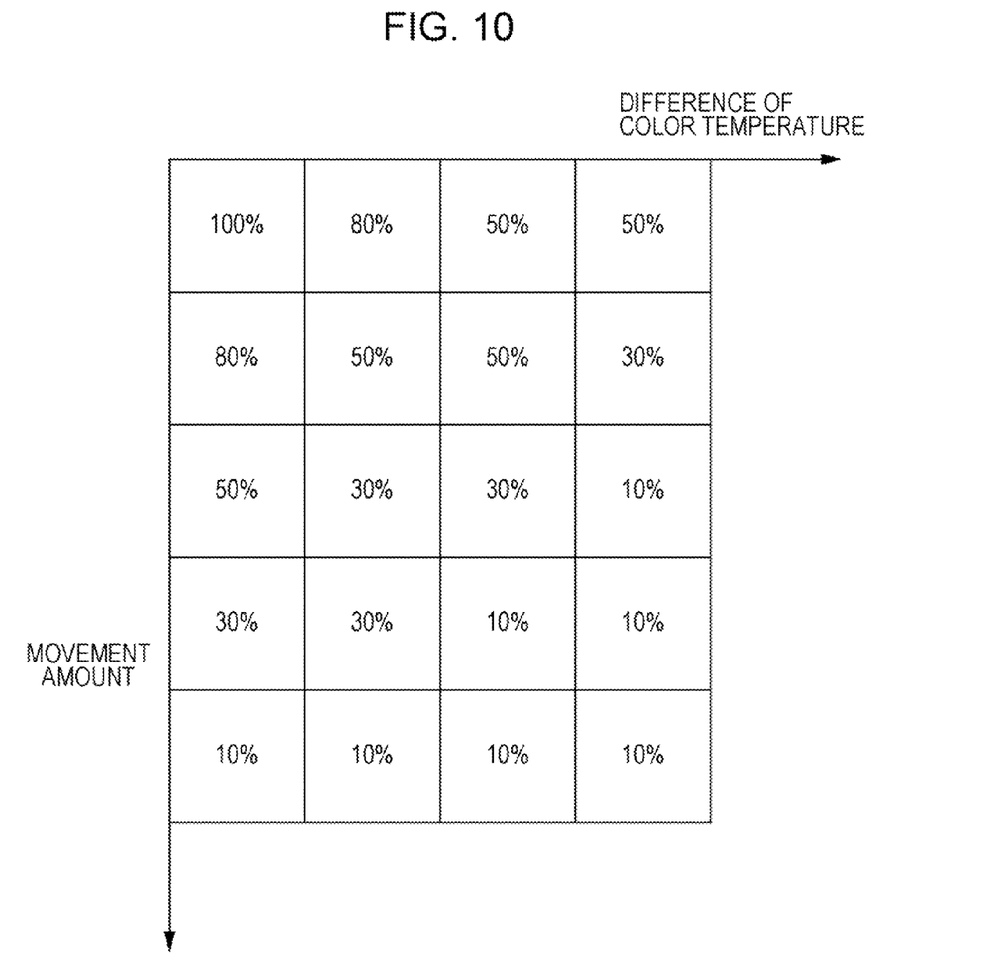
FIG. 10 is a diagram illustrating an example of combination ratio determined in accordance with relationship between movement amount and difference of the color temperatures.

Next, the operation of the image combination ratio determination section 705 when the movement of the object is detected is described. FIG. 10 is a diagram which illustrates a example of combination ratio which determined by relation of the amount of the movement and differences of the color temperatures. In FIG. 10, "MOVEMENT AMOUNT" corresponds to the number of the movement blocks in step S809. "MOVEMENT AMOUNT" is classified into 5 levels in accordance with the number of the movement blocks. "DIFFERENCE OF COLOR TEMPERATURE" means difference of the color temperature between the external light and the flash light.

Numbers in the table illustrated in FIG. 10 indicate correction ratio of the WB coefficient for the main exposure and the WB coefficient for the external light. As the number is smaller, the difference between the WB coefficient for the main exposure and the WB coefficient for the external light is smaller. WB coefficients for the main exposure and WB coefficients for the external light are obtained by equation (12)

$$WB\_R\_evf'[i]=(WB\_R\_evf[i]-WB\_R\_awb)\times S[i]+WB\_R\_awb$$

$$WB\_G\_evf'[i]=(WB\_G\_evf[i]-WB\_G\_awb)\times S[i]+WB\_G\_awb$$

$$WB\_B\_evf'[i]=(WB\_B\_evf[i]-WB\_B\_awb)\times S[i]+WB\_B\_awb$$

$$WB\_R\_cap'[i]=(WB\_R\_cap[i]-WB\_R\_awb)\times S[i]+WB\_R\_awb$$

$$WB\_G\_cap'[i]=(WB\_G\_cap[i]-WB\_G\_awb)\times S[i]+WB\_G\_awb$$

$$WB\_B\_cap'[i]=(WB\_B\_cap[i]-WB\_B\_awb)\times S[i]+WB\_B\_awb \qquad [\text{EQUATION 12}]$$

In equation (12), WB_X_awb (X is R, G, or B) is a WB coefficient of each of colors for an auto white balance mode. WB_X_cap (X is R, G, or B) is a WB coefficient of each of colors for the main exposure. WB_X_evf (X is R, G, or B) is a WB coefficient of each of colors for the external light.

As described above, when the object which has large amount of movement, since areas of which calculation of the irradiation amount of the light is error increase, color shade happens in the area which has large amount of movement. On the other hand, since the color temperature of the flash light is high in general, when image capture is performed under shadow conditions or under a cool color fluorescent light, the difference of the color temperature between the external light and the flash light decreases. In this case, since the WB coefficients for the external light and the flash light in itself becomes closer, the color shade is hard to happen and influence of the object movement is not so large. On the other hand, since difference of the color temperature between the lamp and the flash light is large and the difference of the WB coefficients is large, the color shade is easy to happen and influence of the object movement is large. Accordingly, in accordance with both the movement of the moving object and the difference of the color temperature between the external light and the flash light, it is able to be determined automatically that the object and the background cause the color shade. The color shade caused by image combining can be decreased by making the WB coefficient for the main exposure and the WB coefficient for the flash light closer to the WB coefficient for out white balance.

Figure 11:
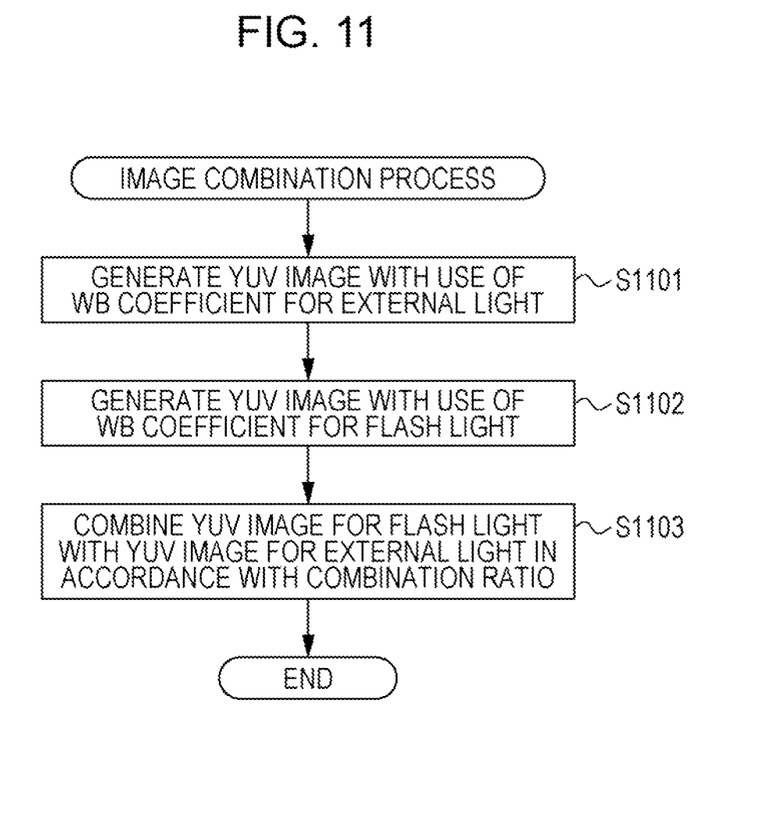
FIG. 11 is a flowchart illustrating image combination process.

Image combination process is described by referring the flowchart illustrated in FIG. 11. In step S1101, the first WB process section 708 performs WB processing of the flashed image 700 with use of the WB coefficient for the external light. Next, the first develop process section 712 develops the flashed image 700 processed by the first WB process section to generate YUV image data for the external light. In step S1102, the second WB process section 709 performs WB process of the flashed image 700 with use of the WB coefficient for the flash light. A second develop processing section 713 develops the flashed image 700 processed by the second WB process section to generate YUV image data for the flash light. In step S1103, an image combination process section 714 combines the YUV image data for the external light and the YUV image data for the flash light to generate combined YUV image data.

A color evaluation value (Y3[i], u3[i], v3[i]) of the combined image signal is calculated with use of the color evaluation value (Y1[i], u1[i], v1[i]) of the image signal for the flash light and the color evaluation value (Y2[i], u2[i], v2[i]) of the image signal for the external light. More specifically, the color evaluation value (Y3[i], u3[i], v3[i]) is calculated by the following equation (13).

$$Y3[i]=Y1[i]\times\alpha[i]+Y2[i]\times(1-\alpha[i])$$

$$u3[i]=u1[i]\times\alpha[i]+u2[i]\times(1-\alpha[i])$$

$$v3[i]=v1[i]\times\alpha[i]+v2[i]\times(1-\alpha[i]) \qquad [\text{EQUATION 13}]$$

At this time, so as to reduce a color variation that may be generated at a boundary between blocks, the WB control circuit 103 may further perform pixel interpolation processing to calculate the combination ratio α'[j] of each pixel from the combination ratio α[i] of each block. For example, the WB control circuit 103 calculates the combination ratio α'[j] of each pixel from the combination ratio α[i] of each block with use of bilinear interpolation as the pixel interpolation processing. At this time, the combined image signal Yuv3 is generated by combining the image signal Yuv1 and the image signal Yuv 2 with use of the combination ratio α'[j] of each pixel. A color evaluation value (Y3[j], u3[j], v3[j]) of the combined image signal Yuv3 is calculated with use of a color evaluation value (Y1[j], u1[j], v1[j]) of the image signal Yuv1 and a color evaluation value (Y2[j], u2[j], v2[j]) of the image signal Yuv2. More specifically, the color evaluation value (Y3[j], u3[j], v3[j]) is calculated by the following equation (14).

$$Y3[j]=Y1[j]\times\alpha'[j]+Y2[j]\times(1-\alpha'[j])$$

$$u3[j]=u1[j]\times\alpha'[j]+u2[j]\times(1-\alpha'[j])$$

$$v3[j]=v1[j]\times\alpha'[j]+v2[j]\times(1-\alpha'[j]) \quad [\text{EQUATION 14}]$$

In this way, according to the present exemplary embodiment, the WB control circuit 103 determines the combination ratio for combining the two image data. To obtain the combined image data in which both the tint of the object and the tint of the background are appropriate, the combination ratio is calculated with use of the movement amount obtained from the image data captured while the flash light is emitted and the image data captured while the flash light is not emitted. Appropriate WB control can be achieved by this calculation.

Other Embodiments

Aspects of the present invention can also be realized by a computer of a system or apparatus (or devices such as a CPU or micro-processing unit (MPU) which may also referred to as an microprocessor) that reads out and executes a program recorded on a memory device to perform the functions of the above-described embodiment(s), and by a method, the steps of which are performed by a computer of a system or apparatus by, for example, reading out and executing a program recorded on the memory device to perform the functions of one or more of the above-described embodiments of the present invention. For this purpose, the program can be provided to the computer for example via a network or from a recording medium of various types serving as the memory device (e.g., computer-readable medium). The computer-readable medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-103212, filed May 2, 2011, which is hereby incorporated by reference herein in its entirety.

What is claimed is:

1. An image processing apparatus comprising:
a first evaluation value calculation unit configured to calculate a first color evaluation value for each of a plurality of areas of image data captured while a flash light is not emitted;
a second evaluation value calculation unit configured to calculate a second color evaluation value for each of a plurality of areas of image data captured while the flash light is emitted;
a movement determination unit configured to determine a movement of an object for each of the areas based on a difference value between the first color evaluation value and the second color evaluation value;
a correction unit configured to generate first corrected image data by correcting the image data captured while a flash light is emitted with use of a first white balance correction value corresponding to a light source which is different from the flash light, and to generate second corrected image data by correcting the image data captured while a flash light is emitted with use of a second white balance correction value corresponding to the flash light;
a ratio determination unit configured to determine, based on the movement determined by the movement determination unit, a ratio for combining the first corrected image data and the second corrected image data for each of the areas; and
a combining unit configured to combine the first corrected image data and the second corrected image data according to the ratio determined by the ratio determination unit.

2. The image processing apparatus according to claim 1, wherein the second evaluation value calculation unit calculates the second color evaluation value based on luminance and color temperature of the flash light.

3. The image processing apparatus according to claim 1, wherein the first evaluation value calculation unit calculates the first color evaluation value by multiplying the image data captured while the flash light is not emitted by a white balance coefficient of a light source obtained when the flash light is not emitted.

4. The image processing apparatus according to claim 1, wherein the movement determination unit determines a movement amount of the object in an entire area of the image based on the results of the movement determination for the plurality of areas.

5. The image processing apparatus according to claim 1, wherein the movement determination unit determines the movement of the object for each of the areas by comparing the calculated difference value with a predetermined threshold value, and
wherein the predetermined threshold value is determined based on the color evaluation value of the image data captured while the flash light is not emitted.

6. An image processing method comprising:
a first evaluation value calculation step of calculating a first color evaluation value for each of a plurality of areas of image data captured while a flash light is not emitted;
a second evaluation value calculation step of dividing image data, captured while the flash light is emitted, into a plurality of areas and calculating a second color evaluation value for each of a plurality of areas of image data captured while a flash light is emitted;
a movement determination step of determining a movement of an object for each of the areas based on a difference value between the first color evaluation value and the second color evaluation value;
a correction step of generating first corrected image data by correcting the image data captured while a flash light is emitted with use of a first white balance correction value corresponding to a light source which is different from the flash light, and generating second corrected image data by correcting the image data captured while a flash light is emitted with use of a second white balance correction value corresponding to the flash light;
a ratio determination step of determining, based on the movement determined by the movement determination step, a ratio for combining the first corrected image data and the second corrected image data for each of the areas; and
a combining step of combining the first corrected image data and the second corrected image data according to the ratio determined by the ratio determination step.

7. The image processing apparatus according to claim 1, wherein the ratio determination unit is configured to determine the ratio for combining by relation of the amount of the movement and a difference of the color temperature between the flash light and the light source which is different from the flash light.

8. An image processing apparatus comprising:
a movement amount estimation unit configured to estimate a movement amount of an object between an image data captured while a flash light is not emitted and an image data captured while a flash light is emitted;
a correction unit configured to generate first corrected image data by correcting the image data captured while a flash light is emitted with use of a first white balance correction value corresponding to an external light source, and to generate second corrected image data by correcting the image data captured while a flash light is emitted with use of a second white balance correction value corresponding to the flash light;
a ratio determination unit configured to determine a ratio for combining the first corrected image data and the second corrected image data for each area, in accordance with the irradiation amount of the flash light and the estimated movement amount of the object; and
a combining unit configured to combine the first corrected image data and the second corrected image data according to the ratio determined by the ratio determination unit.

* * * * *